United States Patent
Tae et al.

(10) Patent No.: US 7,728,599 B2
(45) Date of Patent: Jun. 1, 2010

(54) BATTERY MANAGEMENT SYSTEM AND DRIVING METHOD THEREOF

(75) Inventors: Yong-Jun Tae, Yongin-si (KR);
Soo-Seok Choi, Yongin-si (KR);
Young-Jo Lee, Yongin-si (KR);
Han-Seok Yun, Yongin-si (KR);
Se-Wook Seo, Yongin-si (KR);
Gye-Jong Lim, Yongin-si (KR);
Beom-Gyu Kim, Yongin-si (KR);
Ho-Young Park, Yongin-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 466 days.

(21) Appl. No.: 11/848,680

(22) Filed: Aug. 31, 2007

(65) Prior Publication Data
US 2008/0061764 A1 Mar. 13, 2008

(30) Foreign Application Priority Data
Sep. 7, 2006 (KR) .................. 10-2006-0086149

(51) Int. Cl.
*G01N 27/416* (2006.01)
(52) U.S. Cl. .................. 324/433; 320/116
(58) Field of Classification Search .......... 324/416, 324/427, 433; 320/104, 112, 116, 132
See application file for complete search history.

(56) References Cited

U.S. PATENT DOCUMENTS

| 4,313,080 A * | 1/1982 | Park .................. 320/123 |
| 5,530,335 A * | 6/1996 | Decker et al. .......... 320/102 |
| 6,242,891 B1 * | 6/2001 | Parsonage ............... 320/132 |
| 2005/0046387 A1 * | 3/2005 | Aker et al. ............... 320/125 |

FOREIGN PATENT DOCUMENTS

| JP | 2003-240806 | 8/2003 |
| JP | 2004-86656 | 3/2004 |
| KR | 2006-79505 | 7/2006 |

* cited by examiner

*Primary Examiner*—Edward Tso
(74) *Attorney, Agent, or Firm*—Stein McEwen, LLP

(57) ABSTRACT

A battery management system and a driving method thereof. The battery management system manages a plurality of battery cells, and a plurality of cell relays respectively coupled to the plurality of cells. The battery management system includes a voltage detecting unit and an MCU. The voltage detecting unit receives a first voltage corresponding to an input voltage transmitted through a 3-contact relay coupled to a first cell corresponding to the turn-on first cell relay when the first cell relay is turned on, and generating a second voltage corresponding to the first voltage. The MCU calculates an effective gain in correspondence with a ratio of the second voltage to the input voltage and controls a connection of the 3-contact relay.

16 Claims, 4 Drawing Sheets

BATTERY MANAGEMENT SYSTEM AND DRIVING METHOD THEREOF

CROSS-REFERENCE TO RELATED APPLICATIONS

This application claims the benefit of Korean Application No. 2006-86149, filed Sep. 7, 2006, in the Korean Intellectual Property Office Sep. 7, 2006, the disclosure of which is incorporated herein by reference.

BACKGROUND OF THE INVENTION

1. Field of the Invention

Aspects of the present invention relate to a battery management system and a battery management method. More particularly, aspect of the present invention relate to a battery management system for a vehicle utilizing electrical energy.

2. Description of the Related Art

Vehicles using a gasoline or diesel oil internal combustion engines have caused serious air pollution. Accordingly, various efforts for developing electric or hybrid vehicles have recently been made to reduce air pollution.

An electric vehicle uses an electric motor run by electrical energy output by a power source. Many electric vehicles use a battery formed by one battery pack comprising a plurality of rechargeable/dischargeable secondary cells, as a power source. Electric vehicles benefit the environment because they emit fewer greenhouse gasses and produce less noise.

A hybrid vehicle commonly refers to a gasoline-electric hybrid vehicle that uses gasoline to power an internal combustion engine, and an electric battery to power an electric motor. Recently, hybrid vehicles using an internal combustion engine and fuel cells, and hybrid vehicles using a battery and fuel cells, have been developed. The fuel cells directly obtain electrical energy by generating a chemical reaction between hydrogen and oxygen.

In battery powered vehicles, the number of rechargeable batteries (cells) has been increased to improve the charge carrying capacity and efficiency thereof. A cell balancing control method capable of efficiently managing a plurality of coupled cells and/or battery packs is needed for a battery management system (hereinafter, referred to as "BMS").

To measure a battery's voltage, a differential amplification terminal using a differential amplifier has been used. Such a differential amplification terminal includes at least one resistor, and detects a battery voltage by amplifying a voltage difference input into an input terminal thereof, according to a gain corresponding to a resistance of at least one resistor.

A conventional voltage detecting unit for detecting a battery voltage is required for each of the cells of the battery. As such, since the voltage detecting unit is respectively coupled to the cells of the battery, the number of voltage detecting units has increased as the number of cells has been increased. Accordingly, when the battery voltage is detected using a conventional battery voltage detecting unit, there are problems in that the cost thereof is increased. It is also difficult to determine abnormalities in the circuits of the battery voltage detecting unit, because of small current leakages generated from the voltage detecting unit cell couplings, respectively coupled to the battery cells, and the overall complexity of the circuit structure.

The above information disclosed in this Background section is only for enhancement of understanding of the background of the invention and therefore it may contain information that does not form the prior art that is already known in this country to a person of ordinary skill in the art.

SUMMARY OF THE INVENTION

Aspects of the present invention have been made in an effort to provide a battery management system and method having advantages in determining abnormalities in a battery voltage detection circuit, and a simple structure.

Embodiments of the present invention provide a battery management system comprising a plurality of cells, and a first cell relay among a plurality of cell relays respectively coupled to the plurality of cells. The battery management system can comprise: a 3-contact relay coupled to a first cell corresponding to the turn-on first cell relay when the first cell relay is turned on and coupled to an auxiliary power unit on key-on and parking; a voltage detecting unit to receive a first voltage corresponding to an input voltage transmitted through the 3-contact relay and generate a second voltage corresponding to the first voltage; and an MCU to calculate an effective gain in correspondence with a ratio of the second voltage to the input voltage and control a connection of the 3-contact relay.

The voltage detecting unit may comprise a differential amplification terminal for amplifying the first voltage according to the gain and generating the second voltage. The voltage detecting unit may include a voltage following unit to receive the first voltage and transmitting the second voltage being the same as the first voltage. The 3-contact relay is coupled to the auxiliary power unit on key-on and parking and transmits a reference voltage to the voltage detecting unit, and the MCU calculates an effective gain in correspondence with a ratio of the second voltage to the transmitted reference voltage. The MCU may compare an effective gain calculated on key-on to an effective gain calculated on the previous key-off and determines that the circuit of the voltage detecting unit has an abnormality when the effective gain calculated on key-on is not the same as an effective gain calculated on the previous key-off. The MCU may compare an effective gain calculated on parking to the previous effective gain and determine that the circuit of the voltage detecting unit has an abnormality when the effective gain calculated on parking is not the same as the previous effective gain. The sensing unit comprises an A/D converter to convert an output voltage transmitted from the output terminal of the voltage detecting unit and transmitting the converted output voltage to the MCU.

Another embodiment of the present invention provides a battery management system comprising a plurality of cells and a first cell relay among a plurality of cell relays respectively coupled to the plurality of cells. The battery management system comprises: a 3-contact relay coupled to a first cell corresponding to the turn-on first cell relay when the first cell relay is turned on, and coupled to an auxiliary power unit on key-on and parking; a capacitor to store a first voltage corresponding to an input voltage transmitted through the 3-contact relay; a differential amplification terminal to receive the first voltage stored at the capacitor, amplify the first voltage according to the gain, and generate a second voltage; and a control relay to connect the capacitor with the differential amplification terminal. The battery management system may include an MCU to control the connection of the 3-contact relay with the auxiliary power unit on key-on and parking, and to calculate an effective gain in correspondence with a ratio of the second voltage to the reference voltage transmitted through the 3-contact relay. Yet another exemplary embodiment provides a battery management system comprising: a plurality of cells and a first cell relay among a plurality of cell relays respectively coupled to the plurality of cells; a 3-contact relay coupled to a first cell corresponding to the turn-on first cell relay when the first cell relay is turned on and coupled to an auxiliary power unit on key-on and parking; a capacitor to store a first voltage corresponding to an input voltage transmitted through the 3-contact relay; a voltage following unit to receive the first voltage and transmit a second voltage being the same as the first voltage; and a control relay to control the connection the capacitor with the voltage following unit.

The battery management system may include an MCU to control the connection of the 3-contact relay with the auxiliary power unit on key-on and parking, and to calculate an effective gain in correspondence with a ratio of the second voltage to the reference voltage transmitted through the 3-contact relay.

An exemplary embodiment to another aspect of the present invention provides a driving method of a battery management system of a hybrid vehicle comprising a plurality of cells, an auxiliary power unit, a 3-contact relay coupled to the auxiliary power unit on key-on and parking, and a voltage detecting unit to generate an output voltage using a reference voltage transmitted through the 3-contact relay. The driving method comprises: transmitting the transmitted reference voltage to the voltage detecting unit on key-on and parking; generating an output voltage corresponding to a first voltage by receiving the first voltage corresponding to the reference voltage; calculating an effective gain in correspondence with a ratio of the output voltage to the reference voltage; and comparing an effective gain calculated on key-on and parking to an effective gain calculated on a previous key-off or a previous effective gain.

The generating of the output voltage may include amplifying the first voltage according to the gain and generating the output voltage. The generating of the output voltage may also include receiving the first voltage and transmitting the output voltage being the same as the first voltage. At this time, the driving method further comprises determining that a circuit of the voltage detecting unit has an abnormality when the effective gain calculated on key-on is not the same as the effective gain calculated on the previous key-off, as a result of the comparing of the effective gains.

The driving method further comprises determining that the circuit of the voltage detecting unit has an abnormality when the effective gain calculated on parking is not the same as the previous effective gain as a result of the d) comparing effective gains.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
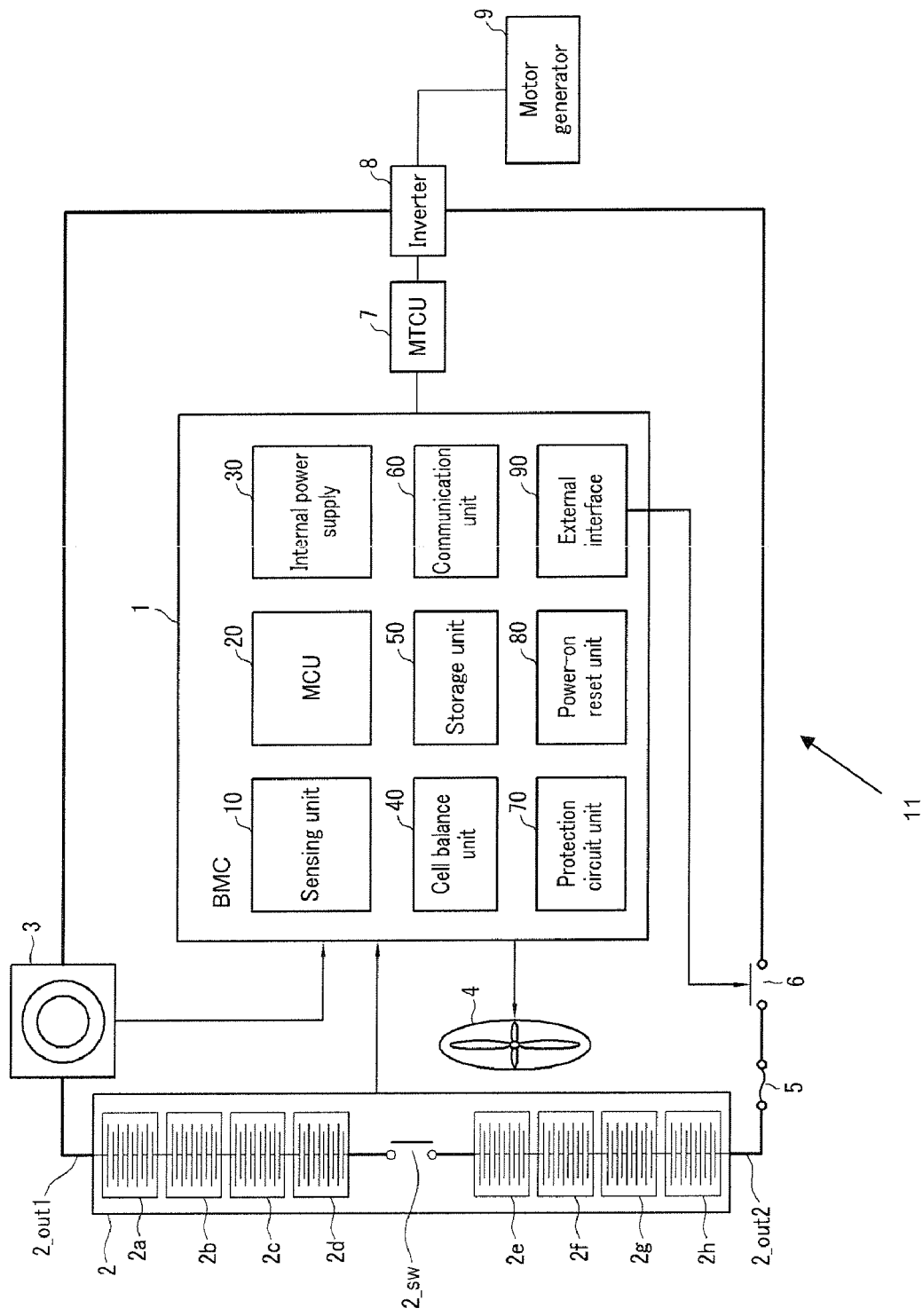
FIG. 1 schematically illustrates a battery, a battery management system, and peripheral devices thereof.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims which follow, when it is described that an element is "coupled to" another element, the element may be "directly coupled" to the other element or "electrically coupled to" the other element through a third element. If an element is in "electrical communication" with another element, electrical signals can be transmitted between the elements. Throughout this specification and the claims which follow, unless explicitly described to the contrary, the word "comprise/include", or variations such as "comprises/includes" or "comprising/including", will be understood to imply the inclusion of stated elements but not the exclusion of any other elements.

According to various embodiments, and as shown in FIG. 1, a battery management system (BMS) 11 comprises a battery management controller (BMC) 1, a battery 2, a current sensor 3, a cooling fan 4, a fuse 5, a main switch 6, a motor control unit (MTCU) 7, an inverter 8, and a motor 9. The components of the battery management system can be in electrical communication with each other. The motor 9 can be an electric motor and/or and electric generator. For example, the motor 9 can function to convert electrical energy into mechanical energy, or can function to convert mechanical energy into electrical energy.

In some embodiments, the battery 2 comprises a plurality of sub-packs 2a to 2h, formed of a plurality of battery cells coupled in series with each other. The battery 2 can comprise output terminals 2_OUT1 and 2_OUT2, and a safety switch 2_SW provided between the sub-pack 2d and the sub-pack 2e. Herein, the eight sub-packs 2a to 2h are exemplarily illustrated, and each sub-pack is formed by grouping a plurality of battery cells in one group, but this is not restrictive. In addition, the safety switch 2_SW is provided between the sub-pack 2d and the sub-pack 2e, and can be manually turned on or off for a user's safety when the user changes a battery, or performs a battery-related operation. In the present embodiment, the safety switch 2_SW is disposed between the sub-pack 2d and the sub-pack 2e, but this is not restrictive. The output terminals 2_OUT1 and 2_OUT2 are coupled to the inverter 8.

The current sensor 3 measures the amount of output current of the battery 2, and outputs the measured amount to a sensor 10 of the BMC 1. In more detail, the current sensor 3 may be provided as a hall current transformer (Hall CT) that measures the amount of output current by using a Hall element and outputs an analog current signal corresponding to the measured amount, or the current sensor 3 may be provided as a shunt resistor that outputs a voltage signal corresponding to a current flowing through a resistor inserted on a load line.

The cooling fan 4 cools heat generated by charging/discharging the battery 2, in response to a control signal from the BMC 1, and prevents the deterioration and/or the reduction of charge/discharge efficiency of the battery 2, which can be caused by a temperature increase.

The fuse 5 prevents an overflow current that may be caused by a disconnection or a short circuit of the battery 2, from being transmitted to the battery 2. That is, when the current is excessive, the fuse 5 is decoupled so as to interrupt the current flow.

The main switch 6 turns on/off the battery 2, in response to the control signal from the BMC 1, or from the MTCU 7, when a malfunction occurs. A malfunction can comprise, for example, an over-voltage, an over-current, and/or an excessive battery temperature. An over-voltage can be defined as a voltage that exceeds a voltage limit of the system. An over-current can be defined as a current (amperage) that exceeds a current limit of the system. An excessive temperature can be defined as a temperature that exceeds the temperature limits of a battery and/or individual battery cells.

According to various embodiments, the BMC 1 comprises a sensing unit 10, a main control unit (MCU) 20, an internal power supply 30, a cell balancing unit 40, a storage unit 50, a communication unit 60, a protection circuit unit 70, a power-on reset unit 80, and an external interface 90.

The sensor 10 measures an overall battery pack current/amperage (hereinafter, referred to as "pack current"), an overall battery pack voltage (hereinafter, referred to as "pack voltage"), each battery cell voltage, each battery cell temperature, and a peripheral temperature. The sensor can transmit the measured values to the MCU 20.

The MCU 20 detects abnormalities in the circuit of the voltage detecting unit 116, using a reference voltage Vref, during key-on (vehicle turn on) and parking. According to various exemplary embodiments of the present invention, an abnormality of the circuit of the voltage detecting unit 116 comprises errors of the circuit due to a short circuit or a burnout, which may occur between constituent elements of the voltage detecting unit 116. According to various embodiments of the present invention, the term "parking" indicates that a 0 (Zero) current flow in the battery of a running or previously running vehicle has continued for a predetermined time. Parking can also comprise an extended period of idling by a vehicle.

Figure 2:
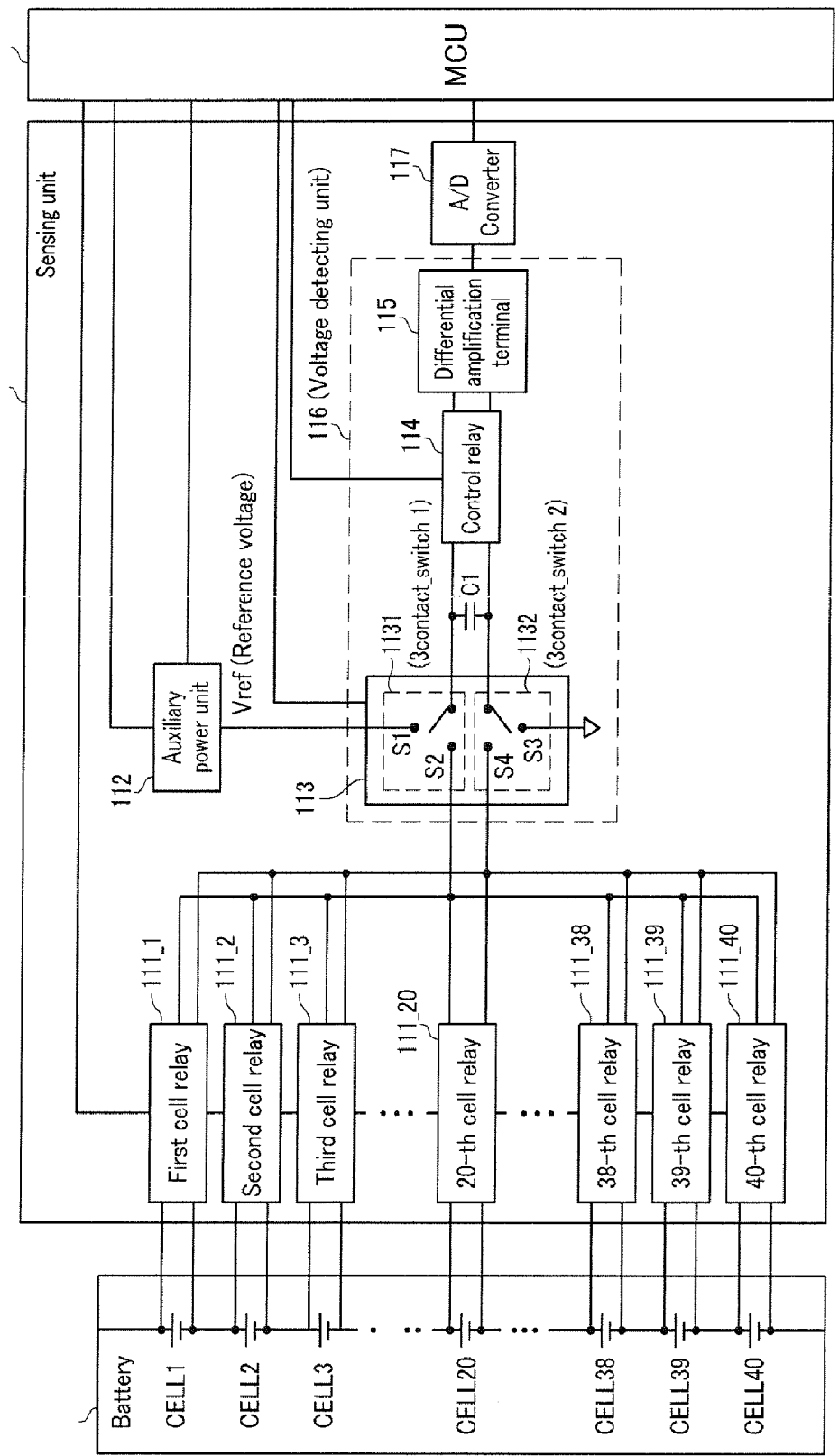
FIG. 2 schematically illustrates a sensing unit and a voltage detecting unit according to various aspects of a first exemplary embodiment of the present invention.

According to some embodiments and as illustrated in FIG. 2, at key-on, the MCU 20 transmits a control signal to a 3-contact relay 113. The 3-contact relay 113 is coupled to an auxiliary power unit 112, in response to the transmitted control signal. The 3-contact relay 113 receives a reference voltage (Vref) from the auxiliary power unit 112, and transmits the Vref to the voltage detecting unit 116. The voltage detecting unit 116 then generates an output voltage corresponding to the transmitted reference voltage Vref that is sent to the MCU 20. The MCU 20 divides the output voltage by the reference voltage Vref, calculates an effective gain at key-on, and compares the calculated effective gain on key-on to an effective gain at the previous key-off. When the calculated effective gain at key-on is the same as an effective gain on the previous key-off, the MCU 20 determines that the circuit of the voltage detecting unit 116 is normal. However, when the calculated effective gain at key-on is not the same as an effective gain at the previous key-off, the MCU 20 determines the circuit of the voltage detecting unit 116 has an abnormality.

According to various embodiments of the present invention, a 3-contact switch is disposed in connection with the output terminals of cell relays 111_1 to 111_40, the auxiliary power unit 112, and a capacitor C1 of the voltage detecting unit 116, and is coupled to the auxiliary power unit 112, or the output terminals of the cell relays 111_1 to 111_40, in response to the control signal of the MCU 20. On parking, the MCU 20 calculates an effective gain on parking in the same manner that the effective gain on key-on is calculated. The MCU 20 compares the calculated effective gain on parking to the previous effective gain. When the calculated effective gain on parking is generally the same as the previous effective gain, the MCU 20 determines the circuit of the voltage detecting unit 116 is normal. However, when the calculated effective gain on parking is not generally the same as the previous effective gain, the MCU 20 determines the circuit of the voltage detecting unit 116 has an abnormality.

In some embodiments, the internal power supply 30 supplies power from a backup battery to the BMC 1. The cell balance unit 40 balances the charging and/or discharging stages of each cell. That is, cells that are relatively highly charged are discharged, and cells that are relatively less charged are charged. The storage unit 50 stores data of the battery's current state of charging (SOC), or state of heating (SOH), when the power source of the BMC 1 is turned off. Herein, any suitable memory device may be used, for example, an electrically erasable programmable read-only memory (EEPROM) may be used for the storage unit 50.

In various embodiments, the communication unit 60 communicates with the MTCU 7 of a vehicle. The communication unit 60 transmits SOC and SOH information from the BMC 1 to the MTCU 7. The communication unit 60 can receive vehicle status information from the MTCU 7, and can transmit the same to the MCU 20. The protection circuit 70 is a secondary circuit for protecting the battery 2 from an over-current or an over-voltage by using hardware elements. The protection circuit 70 protects the battery 2 using firmware disposed in the MCU. The power-on reset unit 80 resets the overall system when the power source of the BMC 1 is turned on. The external interface 90 can be used for coupling auxiliary devices of the BMS 11 to the MCU 20. Examples of auxiliary devices include the cooling fan 4, the main switch 6 and the like.

According to various embodiments, the MTCU 7 computes a present vehicle running state based on information relating to the vehicle's acceleration, breaking, or speed. The MTCU can use this information to compute, for example, information relating to vehicle torque requirements. In more detail, the present vehicle running state comprises a key-on mode for turning on the vehicle, a key-off mode for turning off the vehicle, a standby running mode, and an acceleration running mode. The MTCU 7 transmits the vehicle state information to the communication unit 60, of the BMC 1. The MTCU 7 controls the motor 9 in accordance with the torque information. That is, the MTCU 7 controls the output of the motor 9 in accordance with the torque information by controlling a switch of the inverter 8. Also, the MTCU 7 receives the SOC of the battery 2, from the MCU 20, through the communication unit 60 of the BMC 1, and controls the SOC of the battery 2 to reach a target value (e.g., 55%). For example, when the SOC transmitted from the MCU 20 is lower than 55%, the MTCU 7 causes electric power to flow toward the battery 2, by controlling the switch of the inverter 8, to thereby charge the battery 2. During charging the battery current may have a negative (−) value. When the SOC is higher than 55%, the ECU 7 causes the electric power to flow to the motor generator 9, by controlling the switch of the inverter 8 to discharge the battery 2. During discharge, the battery current may have a positive (+) value. Therefore, the inverter 8 charges/discharges the battery 2 in response to a control signal of the MTCU 7.

Based on the torque information transmitted from the MTCU 7, the motor-generator 9 drives the vehicle by using electrical energy of the battery 2. For example, the MTCU 7 prevents over-charging and/or over-discharging of the battery 2, by charging/discharging the battery 2 within an allowable range on the basis of the SOC information, to thereby efficiently use the battery 2 and/or prolong battery life. In some applications, it can be difficult to measure an accurate SOC after the battery 2 is installed in the vehicle, however, the BMC 1 can accurately measure the SOC by using the battery current and the battery voltage that is sensed by the sensor 10. The BMC 1 can deliver the measured SOC to the MTCU 7.

Now, how to determine an abnormality of a circuit of a voltage detecting unit according to an exemplary embodiment of the present invention is described with reference to FIG. 2, FIG. 3, and FIG. 4.

According to some embodiments, and as shown in FIG. 2, a battery management system 100 can comprise a sensing unit 110. The sensing unit 110 comprises cell relays 111_1 to 111_40, an auxiliary power unit 112, and a voltage detecting unit 116. The sensing unit 110 can receive a control signal from an MCU 120.

In some embodiments, the MCU 120 generates and transmits a first control signal to control the cell relays 111_1 to 111_40. In response to the first control signal, the cell relays 111_1 to 111_40 sequentially connect the plurality of cells of a battery 200 with the voltage detecting unit 116. The MCU 120 can generate and transmit a second control signal to control the 3-contact relay 113. In response to the second control signal, the 3-contact relay 113 connects to the auxiliary power unit 112, or to the output terminals of the cell relays 111_1 to 111_40. The MCU 120 can generate and transmit a third control signal to control a control relay 114, of the voltage detecting unit 116. In response to the third control signal, the control relay 114 transmits the voltage stored at a capacitor Cl, to a differential amplification terminal 115.

Figure 3:
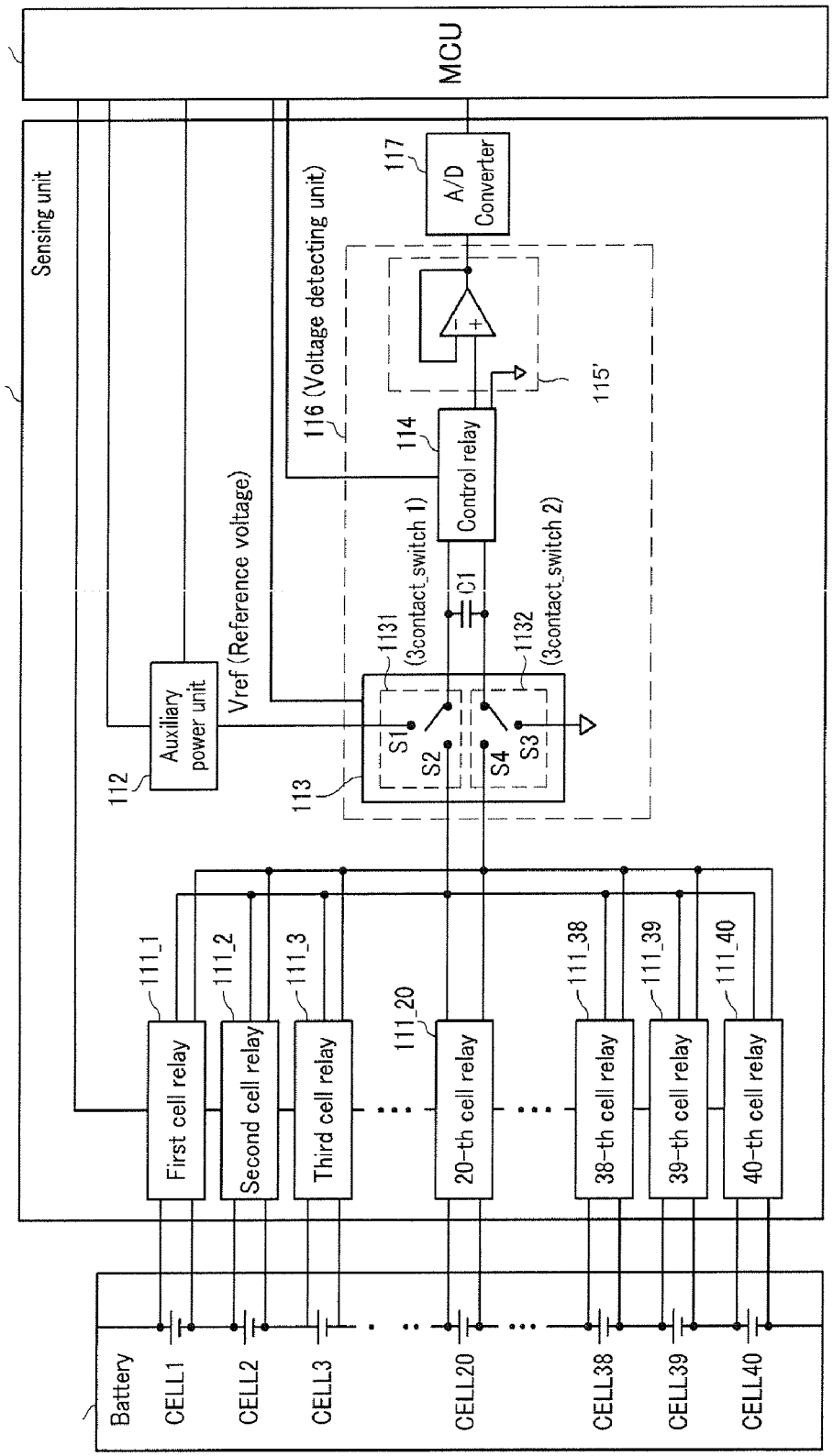
FIG. 3 schematically illustrates a sensing unit and a voltage detecting unit according to various aspects of a second exemplary embodiment of the present invention.

According to the exemplary embodiment as illustrated in FIG. 3, the number of cell relays 111_1 to 111_40 is limited to 40, since the number of the battery cells is limited as 40. However, it is within the scope of the present teaching to alter the number of cell relays such that the number of cell relays generally corresponds with the total number of cells forming the battery. In addition, the output terminals of the cell relays can correspond to the total number of cells coupled thereto. The auxiliary power unit 112 and voltage detecting unit 116 can comprise a common terminal and can be sequentially coupled to the various cell relays. In various embodiments, the input terminal of the voltage detecting unit 116 is the 3-contact relay 113. This configuration can enable the transmission of the battery cell voltage and the reference voltage Vref, through the 3-contact relay 113, without being connected to other switches. Accordingly, the circuit may be simply configured in comparison with the conventional voltage detecting circuit. Thus, a current leakage of the battery may be prevented and the abnormality of the circuit of the voltage detecting unit 116 at key-on and parking may be determined using the reference voltage Vref, transmitted through the 3-contact relay 113, thereby using a battery more safely.

According to various embodiments of the present invention, the term "amplification", with regard to the differential amplification terminal 115 comprises an "increase and/or decrease" of the voltage output from the differential amplification terminal 115. For example, the output voltage of the differential amplification terminal 115 may be "increased and decreased" according to a value of the gain, and for convenience of understanding, the term "differential amplification" is used. The differential amplification terminal 115 comprises one or more resistors, amplifies an input voltage according to a resistance ratio of the resistors, and thereby generates the output voltage. Hereinafter, according to exemplary embodiments of the present invention, the resistance ratio of the resistors of the differential amplification terminal 115 is defined as a "gain" and a value calculated by dividing the output voltage of the voltage detecting unit 116, by the input voltage, for example, a value calculated as a ratio Vout/Vin of the output voltage Vout with respect to the input voltage Vin, is defined as an "effective gain". The differential amplification terminal can be an operational amplifier, for example an inverting operational amplifier, or a non-inverting operational amplifier.

The cell relays 111_1 to 111_40 are respectively coupled to positive terminals and negative terminals of each cell of the battery. The cell relays 111_1 to 111_40 transmit the voltage of each cell of the battery to the 3-contact relay 113, of the voltage detecting unit 116, in response to the first control signal of the MCU 120. In more detail, when a contact S2 is coupled to a first electrode of the capacitor C1, in response to the second control signal transmitted to the 3-contact relay 113, a contact S4, of a 3-contact_switch2 1132 is coupled to a second electrode of the capacitor C1, and the cell relays 111_1 to 111_40 transmit the battery cell voltages to the 3-contact relay 113.

An auxiliary power unit 112 can be coupled to a contact S1, of the 3-contact_switch1 1131, and can apply a reference voltage to the 3-contact relay 113. In more detail, in response to the second control signal transmitted to the 3-contact relay 113, the contact S1 of the 3-contact_switch1 1131 is coupled to the first electrode of the capacitor C1 and the contact S3, of the 3-contact_switch2 1132, is coupled to the second electrode of the capacitor C1. In this manner, the auxiliary power unit 112 applies the reference voltage Vref to the 3-contact relay 113. The voltage detecting unit 116 comprises the 3-contact relay 113, the capacitor C1, the control relay 114, and the differential amplification terminal 115. The voltage detecting unit 116 is a common circuit terminal sequentially coupled to the cell relays 111_1 to 111_40 respectively coupled to the battery cells, receives the battery cell voltage and the reference voltage Vref, amplifies the same according to the gain, and generates an output voltage.

In some embodiments, the 3-contact relay 113 is disposed among the output terminals of the cell relays 111_1 to 111 _40, the auxiliary power unit 112, and the capacitor C1. The 3-contact relay 113 comprises the 3-contact switch1 1131, that can be coupled to the first electrode of the capacitor C1, and to the 3-contact_switch2 1132 that is coupled to the second electrode of the capacitor C1. When the contact S1 of the 3-contact_switch1 1131 is coupled to the first electrode of the capacitor C1, the first contact S3 of the 3-contact_switch2 1132 is coupled to the second electrode of the capacitor C1. When the second contact S2 of the 3-contact_switch1 1131 is coupled to the first electrode of the capacitor C1, the contact S4, of the 3-contact_switch2 1132, is coupled to the second electrode of the capacitor C1.

The 3-contact relay 113 can be operated in response to the second control signal transmitted from the MCU 120. The 3-contact relay 113 is differently operated according to the voltage level of the second control signal. When the second control signal has a first voltage level, the 3-contact relay 113 connects the contact S1 with the first electrode of the capacitor C1, and connects the contact S3 with the second electrode of the capacitor C1, and accordingly, can transmit the reference voltage Vref to the capacitor C1. When the second control signal has a second voltage level, the 3-contact relay 113 connects the contact S2 with the first electrode of the capacitor C1, and connects the contact S4 with the second electrode of the capacitor C1, and accordingly, can transmit the applied battery cell voltage to the capacitor C1.

According to some exemplary embodiments of the present invention, the 3-contact relay 113 is coupled to the auxiliary power unit 112, receives the reference voltage Vref from the auxiliary power unit 112, and transmits the same to the capacitor C1 so as to determine an abnormality of the circuit of the voltage detecting unit 116 at key-on and parking. When the battery cell voltage is detected, the 3-contact relay 113 is coupled to the output terminal of the cell relays 111_1 to 111_40, and transmits the battery cell voltage to the capacitor C1. And then, the control relay 114 transmits the voltage stored at the capacitor C1 to the differential amplification terminal 115. At this time, the contacts S1 and S2, of the 3-contact_switch1 1131, are not coupled to the first electrode of the capacitor C1, and can be referred to as floating, and the contacts S3 and S4, of the 3-contact_switch2 1132, are not coupled to the second electrode of the capacitor C1 and can be referred to as floating.

According to various embodiments, the capacitor C1 stores a voltage corresponding to the battery cell voltage transmitted from the 3-contact relay 113, and the reference voltage Vref. The voltage stored at the capacitor C1 is determined depending on the capacitance of the capacitor C1.

The control relay 114 transmits the voltage stored at the capacitor C1 to the differential amplification terminal 115, in response to the third control signal of the MCU 120.

The differential amplification terminal 115 amplifies the transmitted voltage according to a gain corresponding to a ratio of at least one resistor, and generates an output voltage. The differential amplification terminal 115 transmits the generated output voltage to an A/D converter 117.

According to some embodiments, the A/D converter 117 converts the transmitted output voltage for recognition by the MCU 120, and transmits the converted output voltage to the MCU 120.

Herein, various embodiments for determining circuit abnormalities using the reference voltage Vref, as Vref is transmitted through the 3-contact relay 113, from the auxiliary power unit 112. At key-on and at parking, the 3-contact relay 113 connects the contact S1 in response to the second control signal, and connects the contact S3 with the second electrode of the capacitor C1. The auxiliary power unit 112 then transmits the reference voltage Vref to the capacitor C1. The capacitor C1 stores a voltage corresponding to the transmitted reference voltage Vref. The control relay 114 transmits the voltage corresponding to the transmitted reference voltage Vref to the differential amplification terminal 115, in response to the third control signal of the MCU 120.

In some embodiments, the differential amplification terminal 115 amplifies the transmitted voltage according to the gain, and generates an output voltage that is sent to the MCU 120. The MCU 120 divides the generated output voltage by the reference voltage Vref, and calculates an effective gain. The MCU 120 compares the effective gain calculated at key-on with the effective gain calculated at the previous key-off. When the calculated effective gain at key-on is not the same as the effective gain at the previous key-off, the MCU 120 determines that the circuit of the voltage detecting unit 116 has an abnormality. When the effective gain has been calculated by the reference voltage Vref transmitted while parking, the MCU 120 compares the effective gain calculated while parking to the previous effective gain. When the calculated effective gain while parking is not the same as the previous effective gain, the MCU 120 determines that the circuit of the voltage detecting unit 116 has an abnormality.

FIG. 3 schematically illustrates a sensing unit and a voltage detecting unit according to various embodiments of the present invention. How to determine the abnormality of the circuit using the reference voltage Vref, transmitted through the 3-contact relay 113 that is coupled to the auxiliary power unit 112, can be similar to that described with regard to FIG. 1. Accordingly, only different parts are described herein.

As shown in FIG. 3, the voltage detecting unit 116 comprises a voltage following unit 115'. The voltage following unit 115' receives the voltage stored at the capacitor C1, that corresponds to the reference voltage Vref, and performs a buffer function. The buffer function can be used for outputting the transmitted voltage as it is. The MCU 120 then divides the output voltage generated, by the reference voltage Vref, and calculates an effective gain. The MCU 120 compares the calculated effective gain to either the effective gain at the previous key-off, or the previous effective gain, and checks for an abnormality in the circuit of the voltage detecting unit 116.

The abnormality of the circuit of the voltage detecting unit 116 may be determined by other values generated in correspondence with the reference voltage Vref. The abnormality of the circuit of the cell relays 111_1 to 111_40, respectively coupled to the battery cells, can be determined by comparing the sum of the detected cell voltages to the entire battery voltage, rather than changing the circuit, thereby reducing the cost and simplifying the circuitry.

Figure 4:
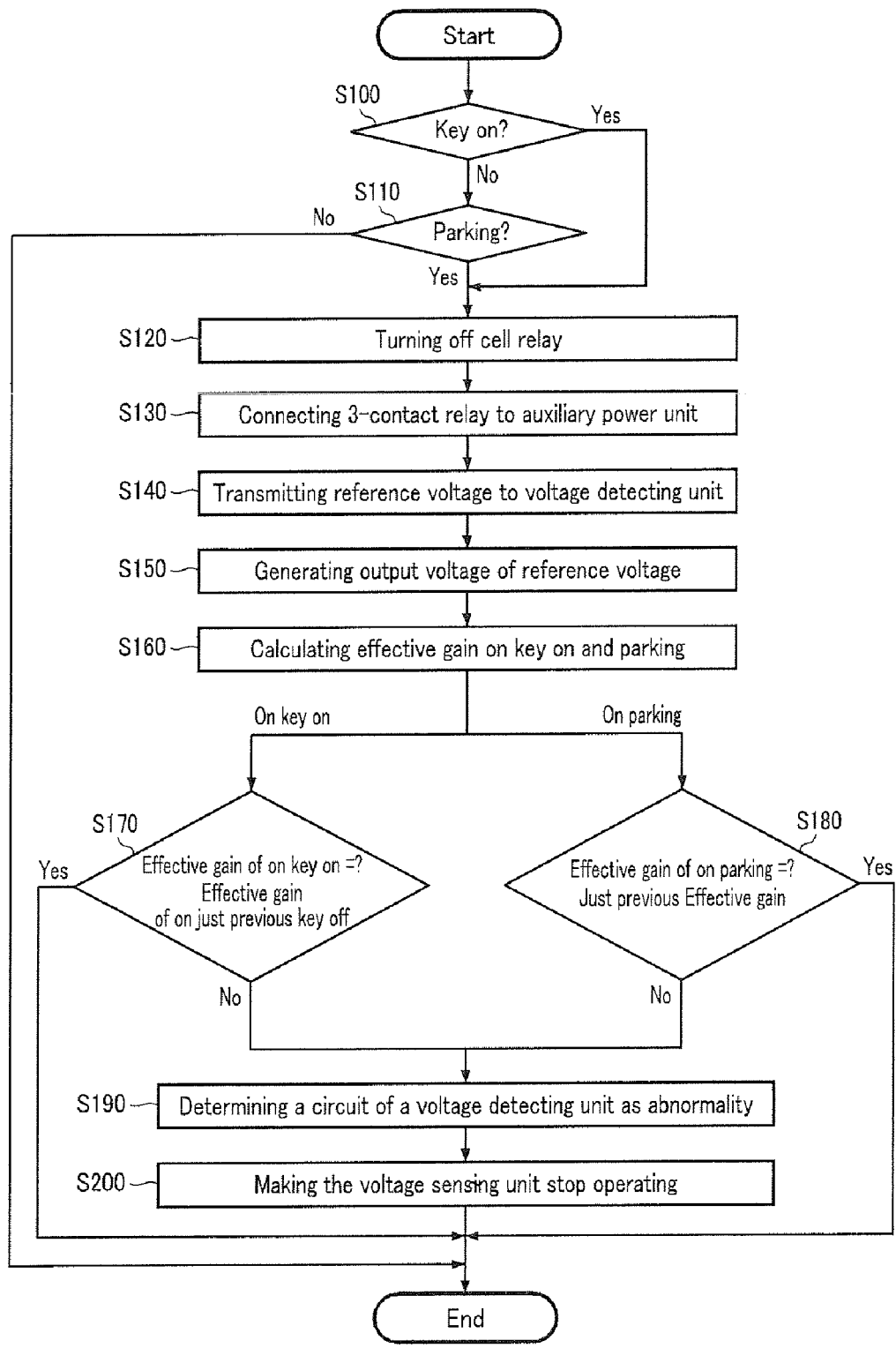
FIG. 4 is a flowchart showing how to determine an abnormality of a voltage detecting unit according to various aspects of an exemplary embodiment of the present invention.

According to various embodiments, and as shown in FIG. 4, at key-on and parking, the voltage detecting unit 116 generates an output voltage corresponding to the transmitted reference voltage Vref. The method involves determining abnormalities of the circuit of the voltage detecting unit 116, using an effective gain calculated by dividing the generated output voltage by a reference voltage Vref, is described in detail.

The method can comprise an operation S100 as to whether a key-on signal is received from a vehicle. In this embodiment the MCU 20 determines whether a key-on signal is detected. If a key-on signal is received, the method proceeds to operation S120. In operation S120, if a key-on signal is detected, the MCU 20 transmits the first control signal. The first control signal triggers the connection of one or more associated cell relays, for example, cell relays 111_1-111_40. In operation S130, the MCU 20 transmits a second control signal to the 3-contact relay 113. The 3-contact relay 113 connects the first contact S1, of the 3-contact_switch1 1131 with the first electrode of the capacitor C1. The 3-contact relay also connects the first contact S3, of the 3-contact_switch2 1132, with the second electrode of the capacitor C1. In operation S140, a reference voltage Vref is transmitted to the capacitor C1.

In operation S150, the voltage detecting unit 116 generates an output voltage corresponding to the transmitted reference voltage Vref. In operation S160, the MCU 20 calculates an effective gain. The effective gain can be calculated by dividing the generated output voltage by the reference voltage Vref.

In operation S170, the MCU 20 compares the effective gain from operation S160 with a previous effective gain. The previous effective gain can be the effective gain determined at the previous key-off. In this instance, the effective gain determined in operation 460 can be referred to as an effective gain at key-on. If, during operation S170, the effective gain at key-on is determined to be the same as the previous effective gain, the MCU 20 determines that the circuit of the voltage detecting unit 116 is operating normally and the method ends. The method can then be repeated.

If, during operation S170, the effective gain at key-on is determined to be different from the effective gain at the previous key-off, the method proceeds to operation S190. In operation S190, the MCU 20 determines that the circuit of the voltage detecting unit 116 has an abnormality. In operation S200 the MCU transmits a first control signal to the cell relays 111_1 to 111_40 and thereby turns off the cell relays 111_1 to 111_40. If a key-on is not determined in operation S100, the MCU 20 makes a parking determination in operation S110. If parking is not detected, the MCU 20 does not determine an abnormality of the circuit of the voltage detecting unit 116, and the method ends.

If parking is detected in operation S110, the method can proceed to operation S120. In operation S120, the MCU 20 transmits the first control signal and connects the cell relays 111_1-111_40, of the voltage sensing unit 110. In operation S130, the MCU 20 transmits the second control signal to the 3-contact relay 113. In response to the second control signal, the 3-contact relay 113 connects the first contact S1, of the 3-contact_switch1 1131, with the first electrode of the capacitor C1 and connects the first contact S3, of the 3-contact_switch2 1132, with the second electrode of the capacitor C1. In operation S140, the MCU 20 transmits the reference voltage Vref to the capacitor C1. At this time, the 3-contact relay 113 transmits the reference voltage Vref to the capacitor C1. In operation S150, the voltage detecting unit 116 generates the output voltage corresponding to the transmitted reference voltage Vref. In operation S160, the MCU 20 divides the generated output voltage by the reference voltage Vref, and calculates an effective gain on parking. In operation S180, the MCU 20 compares the effective gain on parking to the previous effective gain. The previous effective gain can be, for example, the effective gain determined at key on. When a parking signal is detected in operation S110, the effective gain determined in operation S160 can be referred to as an effective gain at parking. If the effective gain at parking is determined to be the same as the previous effective gain, the MCU determines that the circuit of the voltage detecting unit is operating normally, and the method ends. In some embodiments the method then starts again.

In some embodiments, if in operation S180 the effective gain at parking is not the same as the previous effective gain, the method proceeds to operation S190. In operation S190, the MCU 20 determines that the circuit of the voltage detecting unit has an abnormality. In operation S200 the MCU 20 transmits a first control signal to any connected cell relays, and turns off the cell relays 111_1 to 111_40.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

A battery management system and a method thereof according to an exemplary embodiment of the present invention may determine an abnormality of the circuit of the voltage detecting unit using the reference voltage on key-on and parking.

A battery management system and a method thereof according to an exemplary embodiment of the present invention may configure a circuit simply in comparison with the conventional voltage detecting circuit.

Accordingly, the simple circuit determines an abnormality of the voltage detecting unit so that it may reduce cost and prevent a small current leakage.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A battery management system for a plurality of cells, and a plurality of cell relays respectively coupled to the plurality of cells, comprising:
    an auxiliary power unit;
    a voltage detecting unit comprising a 3-contact relay, to transmit an input voltage from at least one cell relay of the plurality of cell relays when at least one of the plurality of cell relays is turned on and transmitting an input voltage from the auxiliary power unit on key-on and parking, to store a first voltage corresponding to the input voltage transmitted through the 3-contact relay, and to generate a second voltage corresponding to the first voltage; and
    an MCU to calculate an effective gain in correspondence with a ratio of the second voltage to the input voltage, and to control the 3-contact relay.

2. The battery management system of claim 1, wherein the voltage detecting unit comprises a differential amplification terminal to amplify the first voltage according to a gain of the voltage detecting unit.

3. The battery management system of claim 1, wherein the voltage detecting unit comprises a voltage following unit to receive the first voltage, and transmit the second voltage, being the same as the first voltage.

4. The battery management system of claim 2, wherein:
    the 3-contact relay electrically connects the auxiliary power unit to the voltage detecting unit on key-on and parking, and the input voltage is a reference voltage; and
    the MCU calculates the effective gain in correspondence with a ratio of the second voltage to the reference voltage.

5. The battery management system of claim 4, wherein the MCU compares an effective gain calculated on key-on to an effective gain calculated on a previous parking, and determines whether a circuit of the voltage detecting unit has an abnormality.

6. The battery management system of claim 5, wherein the MCU compares an effective gain calculated at parking to a previous effective gain calculated on a previous key-on, and determines whether a circuit of the voltage detecting unit has an abnormality based on the comparison.

7. The battery management system of claim 6, wherein the voltage detecting unit further comprises an A/D converter to convert an output voltage transmitted from the voltage detecting unit, and transmit the converted output voltage to the MCU.

8. A battery management system for a plurality of cells, a plurality of cell relays respectively coupled to the plurality of cells, the battery management system comprising:
    an auxiliary power unit;
    a 3-contact relay to transmit an input voltage from at least one cell relay, of the plurality of cell relays, when the at least one cell relay is turned on, and to transmit an input voltage from the auxiliary power unit on key-on and parking;
    a capacitor to store a first voltage corresponding to the input voltage transmitted through the 3-contact relay;

a differential amplification terminal to receive the first voltage stored at the capacitor, and to amplify the first voltage according to a gain and thereby generate a second voltage; and a control relay to selectively connect the capacitor and the differential amplification terminal.

9. The battery management system of claim 8, further comprising:

an MCU to connect the 3-contact relay with the auxiliary power unit on key-on and parking, and to calculate an effective gain in correspondence with a ratio of the second voltage to the reference voltage.

10. A battery management system for a plurality of cells, the battery management system comprising:

an auxiliary power unit;

a 3-contact relay to transmit an input voltage from at least one cell relay, when the at least one cell relay is turned on and to transmit an input voltage from the auxiliary power unit at key-on and parking;

a capacitor to store a first voltage corresponding to the input voltage transmitted through the 3-contact relay;

a voltage following unit to receive the first voltage and transmit a second voltage being the same as the first voltage; and a control relay to selectively connect the capacitor with the voltage following unit when the first voltage is transmitted to the voltage following unit.

11. The battery management system of claim 10, further comprising an MCU to connect the 3-contact relay and the auxiliary power unit on key-on and parking, and to calculate an effective gain in correspondence with a ratio of the second voltage to a reference voltage transmitted through the 3-contact relay.

12. A method for a battery management system comprising a plurality of cells, an auxiliary power unit, and a 3-contact relay coupled to the auxiliary power unit on key-on and parking, and a voltage detecting unit is to generate an output voltage using a reference voltage transmitted through the 3-contact relay, the method comprising:

transmitting the reference voltage to the voltage detecting unit on one of key-on and parking;

generating an output voltage corresponding to the reference voltage;

calculating an effective gain in correspondence with a ratio of the output voltage to the reference voltage; and comparing the effective gain to a previous effective gain calculated on one of a previous key-on and a previous parking.

13. The method of claim 12, wherein the generating of the output voltage comprises amplifying the first voltage according to a gain, and thereby generating the output voltage.

14. The method of claim 12, wherein the generating of the output voltage comprises receiving the reference voltage and transmitting the output voltage, wherein the output voltage is the same as the reference voltage.

15. The method of claim 12, wherein the comparing of the effective gain further comprises determining that a circuit of the voltage detecting unit has an abnormality when the effective gain calculated at key-on is not the same as the effective gain calculated on the previous parking.

16. The method of claim 12, wherein the comparing of the effective gain further comprises determining that a circuit of the voltage detecting unit has an abnormality when the effective gain calculated on parking is not the same as the effective gain calculated on the previous key-on.

* * * * *